United States Patent [19]

Nakamura

[11] 3,919,713

[45] Nov. 11, 1975

[54] COLOR TELEVISION CAMERA

[75] Inventor: Takashi Nakamura, Tokyo, Japan

[73] Assignee: Sony Corporation, Tokyo, Japan

[22] Filed: May 20, 1974

[21] Appl. No.: 471,780

[30] Foreign Application Priority Data

May 26, 1973 Japan ............................ 48-59116

[52] U.S. Cl. .................................... 358/32; 358/44

[51] Int. Cl.[2] ........................................... H04N 9/53

[58] Field of Search ............. 358/43, 44, 47, 32, 27; 178/DIG. 29, DIG. 16

[56] References Cited

UNITED STATES PATENTS

| | | | |
|---|---|---|---|
| 3,708,615 | 1/1973 | Wharton | 358/32 |
| 3,790,702 | 2/1974 | Kubota et al. | 178/DIG. 16 |

*Primary Examiner*—Richard Murray

*Attorney, Agent, or Firm*—Lewis H. Eslinger; Alvin Sinderbrand

[57] ABSTRACT

A color television camera utilizing one vidicon tube having a color filter and producing a video signal, which includes a low-pass filter for deriving a luminance signal from the video signal, a band-pass filter for deriving a chrominance signal from the video signal, a gain control circuit connected to the band-pass filter and a control circuit for controlling the gain control circuit in accordance with the level of the luminance signal.

9 Claims, 5 Drawing Figures

COLOR TELEVISION CAMERA

BACKGROUND OF THE INVENTION

1. Field of the Invention

This invention relates generally to a color television camera utilizing one image pickup tube, and more particularly to a color television camera with a substantially constant gamma.

2. Description of the Prior Art

A low cost color television camera of prior art color television cameras has no device to adjust its iris automatically in accordance with variations in the amount of incident light thereto and hence the iris must be adjusted manually. In the case where such a camera is used, if the amount of incident light thereto is not changed frequently, there may be almost no problem, but if the amount of incident light is changed frequently, the gamma characteristic of the camera is changed in accordance with the amount of incident light, so the iris must be adjusted every time. By way of example, if a vidicon is used with its target voltage being controlled constant, its gamma becomes low as the amount of incident light increases, while the gamma becomes high as the amount of incident light decreases, that is, the gamma of the vidicon becomes different corresponding to the amount of incident light being different. As a result, even if the same white object is picked up by the vidicon, the ratio of red light R, green light G and blue light B changes in accordance with the change of the amount of light, and consequently the ratio of luminance and chrominance signals is not made constant. Thus, even if the white balance is adjusted under normal brightness, the white balance is disturbed when the amount of incident light changes widely. Therefore, in order to produce a picture with good white balance, it is necessary to manually adjust the iris of the vidicon at every occasion that the amount of incident light changes, or to adjust a control circuit for the white balance, which is rather trouble and inconvenient.

SUMMARY OF THE INVENTION

An object of this invention is to provide a color television camera utilizing one image pickup tube in which the level of a chrominance signal is controlled in accordance with the level of a luminance signal to achieve gamma correction.

Another object of this invention is to provide a color television camera which produces a video signal with good white balance irrespective of the change of the amount of incident light.

The other objects, features and advantages of this invention will be apparent from the following description taken in conjunction with the accompanying drawings.

DESCRIPTION OF THE PREFERRED EMBODIMENTS

An embodiment of this invention will be hereinbelow described with reference to the drawings.

Figure 1:
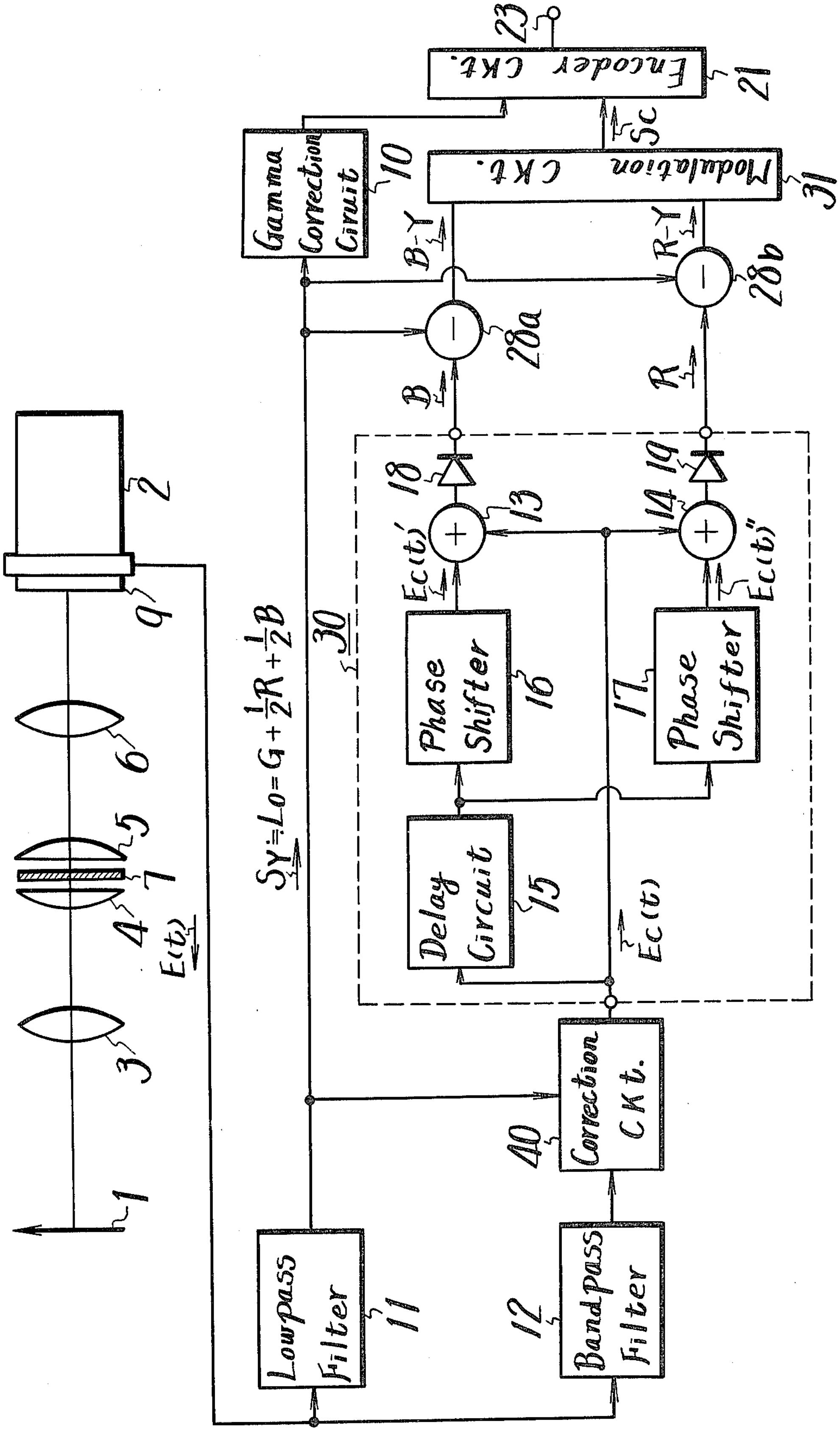
FIG. 1 is a schematic diagram showing an embodiment of the color television camera according to this invention.

In FIG. 1 which shows an embodiment of the invention systematically, reference numeral 1 designates an object to be televised and 2 an image pickup tube. On the light path between the object 1 and the image pickup tube 2, there are arranged an image pickup lens 3, field lenses 4 and 5, and a relay lens 6, respectively, and also a color filter 7 between the field lenses 4 and 5 or on the focus plane of the pickup lens 3.

Figure 2:
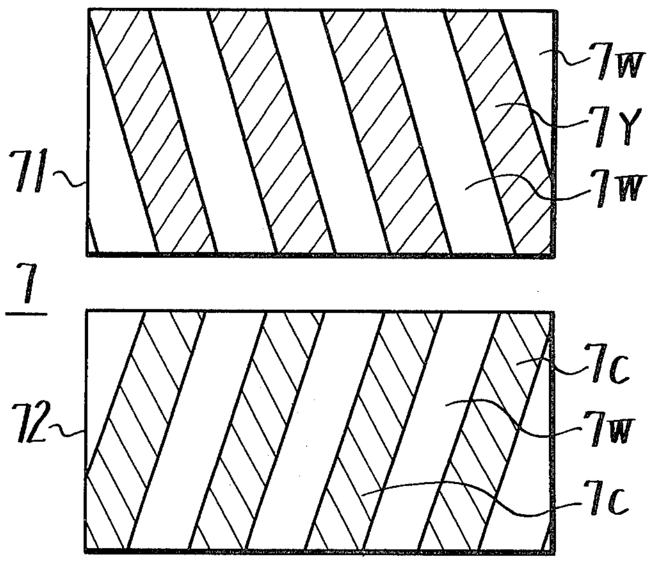
FIG. 2 is front views showing an embodiment of the color striped filter used in the embodiment of FIG. 1 in exploded form.

An example of the color filter 7 is shown in FIG. 2, by way of example, As shown in FIG. 2, the color filter 7 consists of a pair of color striped filters 71 and 72. One color striped filter 71 includes a plurality of striped transparent regions or element $7_W$ which may pass therethrough panchromatic light and a plurality of yellow striped filter regions or elements $7_Y$ which may pass therethrough yellow light. In this case, these regions $7_W$ and $7_Y$ are arranged repeatedly and alternately with an inclination angle (which will be described later) with respect to the horizontal scanning line. The other color striped filter 72 includes a plurality of striped transparent regions or elements $7_W$ and a plurality of cyan striped filter regions or elements $7_C$ which may pass therethrough cyan light. In this case, these regions $7_W$ and $7_C$ are arranged repeatedly and alternately with an inclination angle to the horizontal scanning line opposite to the former inclination angle, or the arranging directions of the both filter regions are symmetrical with respect to the horizontal line between the filters 71 and 72 as shown in FIG. 2. In this case, the arranging pitch of the regions $7_W$ and $7_C$ is same as that of the regions $7_W$ and $7_Y$. The color filter 7, which is formed by superimposing the color striped filters 71 and 72, is placed between the field lenses 4 and 5 as mentioned above.

Thus, the color light components contained in the light from the object 1 are subjected to the special modulation by the color filter 7 with the result that color separated images of checkered pattern with panchromatic light, red light and blue light are projected onto a photo-electric conversion plane 9 of the image pickup tube 2.

Figure 3:
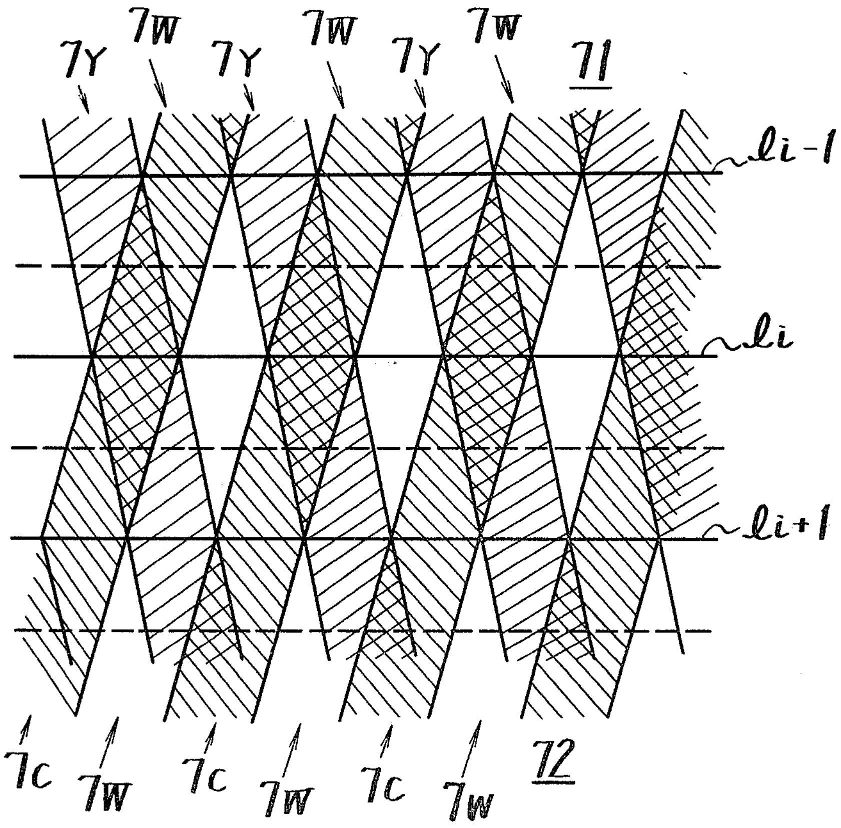
FIG. 3 is a front view of color separated images by the color filter used in the embodiment of FIG. 1.

The inclination angle of the color striped filter 71 to the horizontal scanning line is selected in the following manner. That is, the repeating of the filter regions $7_W$ and $7_Y$ is shifted by $\pi/2$ at every horizontal scanning line or, as shown in FIG. 3, when the color separated image corresponding to the filter 71 is scanned at one of odd and even fields, the output from the image pickup tube 2 corresponding to an arbitrary scanning line $l_i$ is advanced (or delayed) by $\pi/2$ from the output from the image pickup tube 2 corresponding to the following scanning line $l_{i+1}$. As mentioned above, the inclination angle of the regions $7_W$ and $7_C$ of the filter 72 is symmetrical for that of the filter 71, so that when the color separated image corresponding to the filter 72 is scanned, the output from the image pickup tube 2 corresponding to the scanning line $l_{i+1}$ is advanced (or delay) by $\pi/2$ from that corresponding to the scanning line $l_i$.

The output signal from the image pickup tube 2 or signal $E(t)$, which is produced by scanning the color separated images through the filters 71 and 72, is applied to a low-pass filter 11 and a band-pass filter 12, respectively. From the low-pass filter 11 there is derived a low frequency signal $L_O$. Since the low frequency signal $L_O$ can be considered as a luminance signal, this signal will be used as the luminance signal $S_Y$ in the following description. The luminance signal $S_Y$ is applied to a gamma correction circuit 10 for the luminance signal $S_Y$. While, from the band-pass filter 12 there is derived a modulated color signal or chrominance signal $E_C(t)$ which is supplied through a correction circuit 40, described later, to adding circuits 13 and 14 forming a demodulation circuit 30, and also to a delay circuit 15 to be delayed by one horizontal period. The delayed output signal from the delay circuit 15 is applied to phase shifter circuits 16 and 17 to be shifted in phase by $\pi/2$ and $-\pi/2$, respectively. The phase shifted signals $E_C(t)'$ and $E_C(t)''$ are supplied to the adding circuits 13 and 14, respectively, where they are added to the signal $E_C(t)$. The output signals from the adding circuits 13 and 14 are applied to detector circuits 18 and 19, respectively, which produce blue and red color signals B and R by demodulation. The color signals B and R are supplied to subtracting circuits 28*a* and 28*b*, respectively, to be color difference signals B-Y and R-Y which are applied to a modulation circuit 31 supplied with a color sub-carrier signal with the frequency of 3.58MHz. The modulation circuit 31 produces a chrominance signal $S_C$. The chrominance signal $S_C$ and the luminance signal $S_Y$ through the gamma correction circuit 10 are applied to an color encoder circuit 21 where they are converted to the color television signal of, for example, the NTSC system and delivered to an output terminal 23.

The correction circuit 40 controls the level of the chrominance signal, which may pass therethrough, in accordance with the level of the luminance signal $S_Y$. For example, as the amount of incident light increases, the gamma of the image pickup tube 2 becomes low, while as the amount of incident light decreases, the gamma becomes high. Accordingly, the correction circuit 40 operates to increase the level of the chrominance signal as the amount of incident light increases, while to decrease the level of the chrominance signal as the amount of incident light decreases.

An embodiment of the correction circuit 40 will be now described in detail with reference to FIG. 4. In the figure, reference numeral 41 designates an input terminal to which the luminance signal $S_Y$ is applied. The luminance signal $S_Y$ is then applied to a rectifier circuit 42 to be rectified in peak. The output signal from the rectifier circuit 42 is applied to the base electrode of a transistor $Q_1$ which forms a differential amplifier 43 with another transistor $Q_2$. An output terminal 45 is led out from the collector electrode of the transistor $Q_1$ through a band-pass filter 44. A chrominance signal $S''_C$, which is corrected, is obtained at the output terminal 45. The emitter electrodes of the transistors $Q_1$ and $Q_2$ are connected together to the collector electrode of a transistor $Q_3$ the base electrode of which is supplied with a chrominance signal $S'_C$ from the band-pass filter 12. The base electrode of the transistor $Q_3$ is connected to an input terminal 46 for the chrominance signal $S'_C$. Resistors 47 form a bias circuit 48 for the transistor $Q_2$ and reference numeral 49 shows a DC voltage terminal of +B.

As described above, as the amount of incident light increases, the gamma of the image pickup tube 2 becomes small, while as the amount of incident light decrease, the gamma becomes large. Therefore, if the output signal or the level of the chrominance signal $S'_C$ is increased so as to make the gamma great in the case of the amount of incident light being great, while the level of the chrominance signal $S'_C$ is decreased so as to make the gamma small in the case of the amount of incident light, the variation of the gamma can be corrected and hence the ratio of the luminance signal and the chrominance signal can be controlled constant. Accordingly, even if the amount of incident light is varied, the gamma can be held substantially constant and the white balance can be prevented from being deteriorated.

Figure 4:
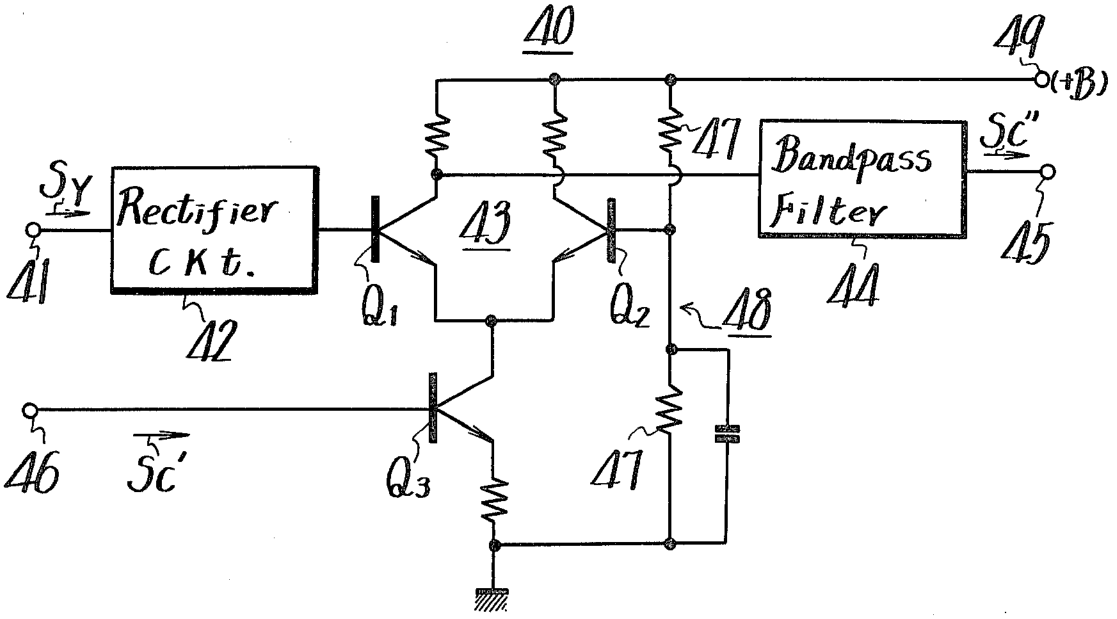
FIGS. 4 and 5 are circuit diagrams showing the main part of the invention, respectively.

With the correction circuit 40 shown in FIG. 4, if the amount of incident light increases and the DC level of the luminance signal, which is rectified in peak becomes high, the collector current of the transistor $Q_1$ increases. Thus, the gain of the chrominance signal $S''_C$ obtained at the terminal 45 is made high. On the other hand, if the DC level of the luminance signal $S_Y$ decreases, contrary to the above, the gain of the chrominance signal $S'_C$ is lowered. Therefore, if the above operations are summarized, the gain of the chrominance signal $S'_C$ is made high or low in accordance with the level of the luminance signal $S_Y$, and this variation of the gain is opposite to that of the gamma in direction. Accordingly, it can be said that the variation of the gamma is corrected externally. As a result, the shift of the white balance caused by the variation of the gamma can be compensated for to produce a picture with good white balance.

Figure 5:
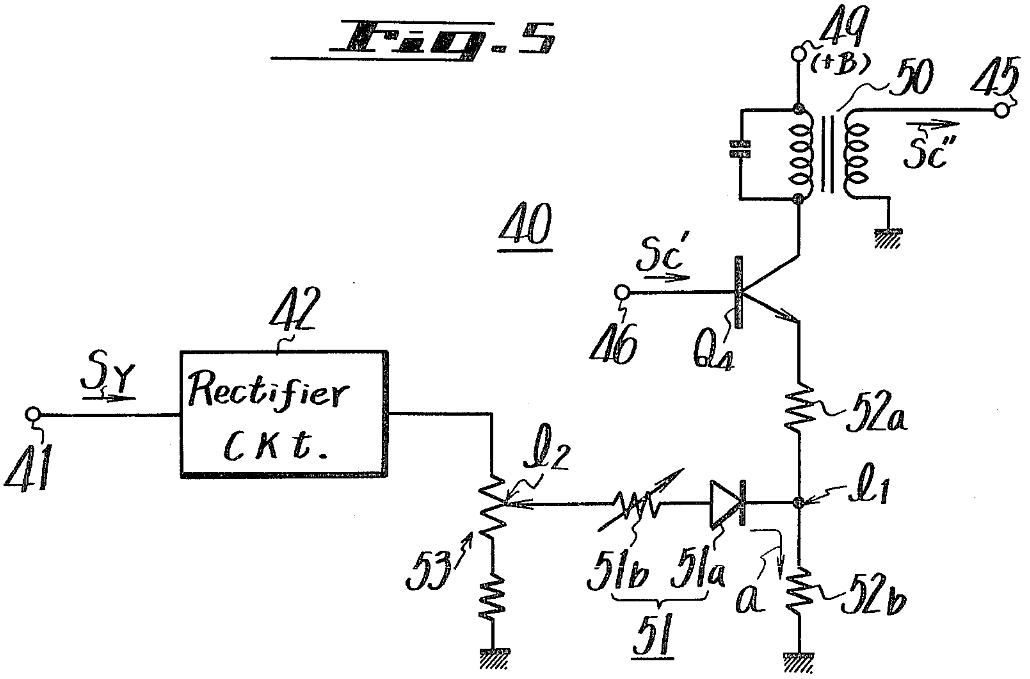

FIGS. 5 shows another embodiment of the correction circuit 40. In this embodiment, the chrominance signal $S'_C$ is applied through an input terminal 46 to the base electrode of a transistor $Q_4$ from the collector electrode of which the output terminal 45 is led out through a coupling transformer 50. A control circuit 51 is provided at the emitter side of the transistor $Q_4$ so as to control the gain of the chrominance signal $S'_C$ in accordance with the level of the luminance signal $S_Y$. The control circuit 51 consists of a series connection of a diode 51*a* and a variable resistor 51*b*, and is connected at its one end to a connection point $l_1$ between emitter resistors 52*a* and 52*b* for the transistor $Q_4$ and at its other end to the rectifier circuit 42 through a resistor group 53 for dividing the peak-rectified DC voltage.

The voltage appeared at a connection point $l_2$ between the control circuir 51 and the resistor group 53 changes in accordance with the DC level of the luminance signal $S_Y$ which is peak-rectified. However, if a current path *a* passing through the control circuit 51 is formed, the impedance of the transistor $Q_4$ at its emitter side decreases, so that the gain of the chrominance signal $S'_C$ becomes high. On the contrary, if the current path *a* is not formed, the impedance increases to make the gain low. Accordingly, if the voltage at the connection point $l_2$ is controlled by the level of the luminance signal $S_Y$, the current path *a* passing through the control circuit 51 is formed as the level increases, but the current path *a* is not formed as the level decreases. Therefore, in the manner as described in connection with FIG. 4, the gain of the chrominance signal $S'_C$ can be controlled to achieve the correction of the gamma. As a result, even if the amount of light changes, the white balance can be achieved.

As described above, with this invention the gain of the chrominance signal $S'_C$ is controlled in accordance with the level of the luminance signal $S_Y$ to control the gamma of the image pickup tube to be constant even if the gamma is tended to be changed by the amount of incident light. Accordingly, the white balance is prevented from being disturbed to always reproduce a good picture. And hence, when the picture is deteriorated or the amount of light is changed, it is no need to adjust the white balance at every change. Accordingly, it will be apparent that the present invention is much preferred when it is adapted in a camera of simple construction.

In the above embodiment of this invention, a normal camera in which the target voltage of the image pickup tube 2 is not controlled is employed, so that the level of the luminance signal $S_Y$ is changed in accordance with the amount of incident light. Accordingly, the gain of the chrominance signal $S'_C$ is controlled by the level of the luminance signal $S_Y$ to make the gamma characteristic constant. However, it is also possible to use the target voltage as the control signal in addition to or in place of the luminance signal $S_Y$.

Such a camera is known with which, in order to make its picked up output constant irrespective of the amount of incident light, the target voltage is changed in accordance with the output level from the image pickup tube to vary the sensitivity of the image pickup tube. In this type of a camera, when the output signal level is lowered, the target voltage is made high so as to make the sensitivity of the image pickup tube high. In this case, since the output signal is controlled constant, the luminance signal can not be utilized as the control signal. Due to the fact that when the target voltage is made high, the gamma of the pickup tube is apt to be great, it is performed in order to hold the white balance always that when the amount of incident light is small, the target voltage is made high and applied to the terminal 41 shown in FIG. 4 or FIG. 5 to decrease the gain of the chrominance signal. Thus, even if the gamma increases, the gamma characteristic is approximately constant with the result that the white balance is not disturbed even in this case. In this case, however, the output terminal 45 must be led out from the collector electrode of the transistor $Q_2$ in the embodiment of FIG. 4.

It may be apparent that many modifications and variations could be effected by those skilled in the art without departing from the spirits and scope of the novel concepts of this invention.

I claim as my invention:

1. Color television camera apparatus for producing a video signal having good white balance irrespective of the change of intensity of incident light, comprising an image pickup tube having an image pickup surface which is scanned by successive scan lines thereacross; color filter means for separating an image of a viewed objective projected onto said image pickup surface into separate color components being constituted by two primary color components each having a modulated intensity across a scan line and a third primary color component having a substantially uniform intensity across said scan line; means for deriving frequency-separated signals in response to the scanning of said color separated components on said image pickup surface, said derived signals including two modulated signal components representing said two intensity-modulated primary color components and a substantially unmodulated signal component representing said uniform-intensity third primary color component; control signal generating means for generating a control signal proportional to the magnitude of said unmodulated signal component; and signal level control means for receiving at least said two modulated signal components and coupled to said control signal generating means for receiving said control signal to vary the level of said received modulated signal components as a function of said control signal.

2. Color television camera apparatus as claimed in claim 1, wherein said color filter means comprises a first set of yellow color filter strips and a second set of cyan color filter stripes, said first and second sets being slanted to intersect with each other.

3. Color television camera apparatus as claimed in claim 1 wherein said signal level control means comprises a transistor having an input electrode for receiving said at least two modulated signal components, said transistor having a current flowing therethrough which is a function of the modulated signal components level; circuit means coupled to said transistor for deriving an output current determined at least in part by said transistor current and for receiving said control signal to vary said output current in accordance with said control signal; and means for producing am amplifier chrominance signal as a function of said output current.

4. Color television camera apparatus as claimed in claim 3 wherein said circuit means comprises an amplifier connected to the collector electrode of said transistor and having an amplifier current flowing therethrough that is substantially equal to said transsistor current; and means for supplying said control signal to vary at least a portion of said amplifier current, said portion of said amplifier current corresponding to said output current.

5. Color television camera apparatus as claimed in claim 4 wherein said amplifier comprises a differential amplifier including differentially-connected transistors having their common-connected electrodes connected to said collector electrode of said transistor, wherein said control signal is supplied to one input of said differential amplifier, a reference signal is supplied to another input of said differential amplifier and said output current flows through said differential amplifier.

6. Color television camera apparatus as claimed in claim 3 wherein said circuit means comprises impedance means connected in series with the emitter circuit of said transistor; and semiconductor means having an input supplied with said control signal and an output coupled to said impedance means as a function of said control signal.

7. Color television camera apparatus as claimed in claim 6 wherein said semiconductor means is a diode.

8. Color television camera apparatus as claimed in claim 1 wherein said control signal generating means comprises low pass filter means for separating said unmodulated signal components from said derived frequency-separated signals; and rectifier means coupled to said low pass filter means for producing a DC control signal in response to said separated unmodulated signal component.

9. Color television camera apparatus for producing a video signal having good white balance irrespective of the change of intensity of incident light, comprising an image pickup tube having an image pickup target which is scanned by successive scan lines thereacross; color filter means for forming a color separated image of a viewed image on said image pickup target; means for deriving a chrominance signal from the composite output signal produced by said image pickup tube; a transistor having an input electrode for receiving said chrominance signal, said transistor having a current flowing therethrough which is a function of the chrominance signal level; circuit means coupled to said transistor for deriving an output current determined at least in part by said transistor current and for receiving a signal proportional to the target voltage of said image pickup tube to vary said output current in accordance with said target voltage; and means for producing an amplified chrominance signal as a function of said output current.

* * * * *